United States Patent
Li

(10) Patent No.: US 7,589,034 B2
(45) Date of Patent: Sep. 15, 2009

(54) TREATED ACTIVATED CARBON AND PROCESS FOR MAKING SAME

(75) Inventor: Shulong Li, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 74 days.

(21) Appl. No.: 10/853,938

(22) Filed: May 26, 2004

(65) Prior Publication Data

US 2005/0266750 A1    Dec. 1, 2005

(51) Int. Cl.
    *B32B 27/04*    (2006.01)
(52) U.S. Cl. .................... 442/82; 428/365; 428/402
(58) Field of Classification Search ............... 428/365, 428/402; 442/82
    See application file for complete search history.

(56) References Cited

U.S. PATENT DOCUMENTS

| | | | |
|---|---|---|---|
| 3,235,323 A | 2/1966 | Peters | 8/189 |
| 3,256,206 A | 6/1966 | Doying | 502/433 |
| 3,556,712 A | 1/1971 | Dickson et al. | 106/18.11 |
| 3,639,140 A | 2/1972 | Miyamichi | 427/227 |
| 3,744,534 A | 7/1973 | Henry et al. | 139/426 R |
| 3,769,144 A * | 10/1973 | Economy et al. | 442/242 |
| 3,850,785 A | 11/1974 | McQuade et al. | 442/2 |
| 4,459,332 A | 7/1984 | Giglia | 428/86 |
| 4,510,193 A | 4/1985 | Blucher et al. | 428/196 |
| 4,681,790 A | 7/1987 | Fong | 428/96 |
| 4,732,805 A * | 3/1988 | Maggs | 442/76 |
| 4,857,243 A | 8/1989 | Von Blucher et al. | 264/13 |
| 5,127,925 A * | 7/1992 | Kulprathipanja et al. | 95/54 |
| 5,209,887 A | 5/1993 | Von Blucher et al. | 264/117 |
| 5,380,594 A | 1/1995 | Von Blucher et al. | 428/403 |
| 6,726,744 B2 * | 4/2004 | Kulprathipanja et al. | 95/45 |
| 2004/0074011 A1 * | 4/2004 | Jones, Jr. | 8/115.51 |

FOREIGN PATENT DOCUMENTS

JP    04-285006    10/1992

* cited by examiner

*Primary Examiner*—Arti Singh-Pandey
(74) *Attorney, Agent, or Firm*—Sara M Current

(57) ABSTRACT

The present disclosure relates to a durable chemical treatment to enhance the adsorbency of activated carbon, which may be exposed to liquids such as rain, sweat, water, and the like. The treatment comprises a fluorocarbon that is applied at low add-on levels (that is, between about 0.1% and about 5%). The treated activated carbon is useful in a number of applications, including air filters, gas masks, solvent recovery devices, and chemical and biological protective gear.

8 Claims, No Drawings

TREATED ACTIVATED CARBON AND PROCESS FOR MAKING SAME

TECHNICAL FIELD

The present disclosure relates to a durable chemical treatment to improve the adsorbency of activated carbon, which may be exposed to liquids such as rain, sweat, water, and the like. The treatment comprises a fluorocarbon that is applied at low add-on levels. The treated activated carbon is useful in a number of applications, including air filters, gas masks, solvent recovery devices, and chemical and biological protective gear.

BACKGROUND

Activated carbon comes in a variety of forms. Initially, it was made in the form of granules or powder. More recently, it has been made in the form of a fabric known as charcoal cloth or carbon cloth. Activated carbon is used to adsorb undesirable components from the atmosphere or from a local environment. However, it is known that the effectiveness of activated carbon can be comprised by other components, not necessarily undesirable per se, that saturate the activated carbon and prevent it from adsorbing the undesirable components. The most common component that leads to such saturation of activated carbon is water.

Activated carbon is used in clothing to provide protection against undesirable components, but when such clothing is wet, the effectiveness of the activated carbon in adsorbing the undesirable component is drastically reduced. Also, the additional weight of such wet clothing presents a further disadvantage. To overcome this problem, carbon cloth is often used as one component in a composite structure that includes a relatively waterproof, outer fabric layer.

There is a problem associated with using such a waterproof barrier fabric as either the outer layer of a carbon cloth composite or the inner layer of such a composite. Because the barrier fabric cannot prevent moisture condensation on the activated carbon, liquids (e.g, sweat or water) can reach the activated carbon and inhibit its adsorption ability. Once the moisture has condensed on the surface of the activated carbon, the barrier fabric actually traps the moisture on the activated carbon, preventing evaporation. The so-called barrier fabrics are especially incapable of performing their intended role—that is, preserving the adsorptive properties of the activated carbon—in the laundering process, where the composite is exposed not only to large amounts of water, but also to detergents, soil, and other contaminants.

U.S. Pat. No. 4,732,805 to Maggs describes treating activated carbon with a fluorocarbon resin at add-on levels of 5% to 10% of the weight of the carbon cloth. The preferred fluorocarbon resin is polytetrafluoroethylene (PTFE) having a primary particle size of 0.1 microns. A major shortcoming with this approach, however, is that the PTFE particles, which are by their nature non-sticking, do not bond well under normal process temperatures, resulting in a treatment with very poor durability. PTFE typically requires temperatures of at least 300° C. for bonding. Indeed, it is unlikely that such treatment would withstand routine laundering procedures.

Accordingly, there is a clear need for a treatment for activated carbon that is durable with respect to multiple launderings and that is capable of maintaining practical levels of adsorption over time.

SUMMARY

The present disclosure relates to a treatment for activated carbon, and particularly carbon cloth, that is wash-durable and that is present at low add-on levels. The treatment comprises the application of a fluorocarbon compound that dries at temperatures below 300° C., and preferably below 200° C., to form a film. A cross-linking agent can also be employed to improve durability.

DETAILED DESCRIPTION

Disclosures relating to the preparation of carbonized and active carbon yarns and fabrics and the utilization thereof in protective clothing of various types to serve as protection against various hazards may be found in U.S. Pat. No. 3,235,323 to Peters; U.S. Pat. No. 3,256,206 to Doying; U.S. Pat. No. 3,556,712 to Dickson et al.; U.S. Pat. No. 3,639,140 to Miyamichi; U.S. Pat. No. 3,744,534 to Henry et al.; U.S. Pat. No. 3,769,144 to Economy et al.; U.S. Pat. No. 3,850,785 to McQuade et al; and others. The above list is intended to be representative and should not be taken as a complete list of patents relating to carbon fabrics or processes by which they may be produced.

In addition to carbon cloth, powders, particles, granules, spheres, extruded pellets, and fibers can all be enhanced in accordance with the present treatment. Further, the activated carbon can originate from sources including, but not limited to, coconut shells, coal, wood, rayon, peat, polyacrylonitrile, phenol formaldehyde resin, and cross-linked polystyrene resin.

The treatment comprises impregnating or coating the activated carbon with fluorocarbon compounds that effectively modify the surface energy of the carbon material. Suitable fluorocarbons include those that dry to form a water- and oil-repellent film at temperatures below about 300° C. and, more preferably, at temperatures below about 200° C. The fluorocarbon compounds are preferably copolymer resins containing a monomer with a $C_4$ to $C_{24}$ perfluoro-alkyl radical and a non-fluorinated monomer. Examples include copolymers containing perfluorinated $C_8$ acrylate monomer and alkyl acrylates, and polyurethanes containing $C_8$ perfluoro-alkyl radicals.

The fluorocarbon compounds can be applied to the activated carbon as an emulsion or solution by spraying, immersion, or fluidized bed application, each of which is followed by a drying step. The fluorocarbon compounds are present at add-on weights of 5% or less and, more preferably, 3% or less, where percentages are based on the weight of the activated carbon. Even at add-on levels of as low as 0.1% of the weight of the activated carbon, the fluorocarbon treatment has been found effective. Preferably, the add-on weights are in the range between 0.1% and 5% of the weight of the activated carbon and, more preferably, in the range between 0.1% and 3%. A cross-linking agent, such as a polyisocyanate cross-linking agent, can be incorporated into the mixture to improve the durability thereof.

In one preferred embodiment, the treatment process is conducted in several steps. First, activated carbon is impregnated with a solvent such as water, acetone, or alcohol, so that solvent molecules occupy the internal pores responsible for gas adsorption. Next, a solution or emulsion containing the fluorocarbon compound(s) is brought into contact with the activated carbon by immersion, spraying, or fluidized bed application. The fluorocarbon molecules cling to the surface of the activated carbon, since solvent molecules are blocking the internal pores. Finally, the treated carbon is dried at elevated temperatures to evaporate the solvent from the internal pores of the carbon. Typically, temperatures of about 100° C. to about 400° C. are suitable for this purpose, although temperatures of about 100° C. to about 200° C. are sufficient when water is used as the solvent.

Because the fluorocarbon treatment application is limited to the surface of the activated carbon, the adsorption properties of the activated carbon are not adversely affected. Rather, the internal pores of the activated carbon remain available for adsorption of undesirable components and the repellent finish on the surface of the carbon helps to preserve its adsorption ability.

The activated carbon, treated according to this process, has good durability, whether washed using home or industrial procedures. Even more importantly, the treatment prevents the adverse effects with respect to the durability or level of effectiveness of the activated carbon often seen with exposure of the activated carbon to laundry detergents and additives.

EXAMPLE 1

Product OLC™, coconut-based activated carbon granules, sold by Calgon Carbon Corporation of Pittsburgh, Pa., and having particle sizes of 20 to 50 US Mesh, were used in this Example. The carbon granules were dipped into an emulsion containing 4 grams of a non-PTFE fluorocarbon compound sold by Clariant Corporation of Charlotte, N.C., under the tradename NUVA® CPA, Version 5523, and 96 grams of water. (The resulting emulsion contained about 0.5% by weight of fluorocarbon compound.) NUVA® CPA fluorocarbon emulsion is believed to be an acrylic copolymer containing a monomer with a perfluorinated alkyl chain.

Fine white foam was observed when the activated carbon granules were immersed into the emulsion, indicating the emulsion was displacing gas from the internal pore structure of the activated carbon. The mixture was poured through a filtration funnel, with some vacuum suction being applied through an aspirator pump. The carbon granules were collected on filter paper.

The treated carbon granules were dried in a lab oven at about 150° C. for 30 minutes. The fluorocarbon add-on level on the carbon granules was calculated to be about 1.21% by weight of the granules.

A comparison of untreated and treated carbon granules was conducted. The untreated granules were easily wet with water and some gas was observed as water displaced the gas in the internal pores of the granules. The treated granules, however, could not be wet with water or by an artificial sweat solution, and no gas evacuation was observed, indicating that the water had not penetrated and rendered ineffective much of the internal pore structure that characterizes the carbon granules.

EXAMPLE 2

An activated carbon cloth made from phenol formaldehyde resin fiber and sold by American Kynol of Pleasantville, N.Y., under the tradename ACC-5092-25 was used in this Example. The carbon in the cloth had a surface area of about 2300 m$^2$/g, as measured using the Brunauer-Emmett-Teller (BET) model of physical adsorption, where nitrogen is the adsorptive.

A piece of the carbon cloth was immersed in water. The carbon cloth was then removed from the water and immediately immersed in a fluorocarbon mixture. The fluorocarbon mixture contained 4 grams of NUVA® CPA, Version 5523, a non-PTFE fluorocarbon, and 96 grams of water. No foaming was observed. The carbon cloth was squeezed between nip rolls at a pressure of about 20 p.s.i. to remove excess solution. The treated cloth was then dried in a lab oven at 150° C. for 30 minutes.

The fluorocarbon add-on level on the carbon cloth was about 3.8% of the weight of the fabric. The treated carbon cloth exhibited good water-repellent properties, as evidenced by a test in which water droplets that were applied to the surface of the treated carbon cloth rolled off without wetting the cloth.

EXAMPLE 3

A granular activated carbon, having particle sizes of 20 to 50 US Mesh and sold by Japan Enviro Chemical, Ltd. under the tradename "Wh2c20," was used in this Example. The activated carbon granules were made from coconut shells.

Activated carbon granules were immersed in water and then removed from the water by filtration. The carbon granules were then immediately immersed in a fluorocarbon mixture. The fluorocarbon mixture contained 4 grams of NUVA® CPA, Version 5523, a non-PTFE fluorocarbon, and 96 grams of water. The fluorocarbon add-on level on the carbon granules was about 0.5% of the weight of the granules. No foaming was observed, when the carbon granules were immersed in the fluorocarbon mixture. After being immersed in the fluorocarbon solution, the carbon granules were filtered to remove excess solution. The treated granules were then dried in a lab oven at 150° C. for 30 minutes.

The water repellency of the treated granules was compared with that of the untreated granules by wetting the granules. The untreated granules readily absorbed the water as it was applied. In contrast, water pooled around the treated granules, until the water depth was such that the treated granules floated on the surface of the water.

Gas Adsorption Evaluation

To evaluate the gas adsorptive properties of the products of Examples 1, 2, and 3, the following test was devised.

0.100 grams of treated granules from Example 1 were placed in a first 250-milliliter glass jar fitted with a gas-tight top with rubber septum.

0.08 grams of treated fabric from Example 2 were placed in a second 250-milliliter glass jar fitted with a gas-tight top with rubber septum.

0.100 grams of treated granules from Example 3 were placed in a third 250-milliliter glass jar fitted with a gas-tight top with rubber septum.

At the bottom of each of the three jars were two layers of paper towel that were completely saturated with an artificial sweat solution. The treated carbon was placed directly on the paper towels. The artificial sweat solution contained 0.8% sodium chloride, 0.1% magnesium sulfate, 0.1% lactic acid, 0.05% potassium sulfite, 0.05% urea, 0.015% glucose, 0.01% sodium sulfate, 0.004% butyric acid, 0.004% calcium chloride, and 98.867% water.

3 microliters of toluene was injected into each sealed jar, whereupon the toluene quickly evaporated into the gas phase.

Approximately 10 minutes after the toluene was injected into each jar, a 1-milliliter sample of gas was taken from each jar. The gas samples were injected into a Perkin Elmer Gas Chromatograph (GC) to measure the toluene concentration in the closed atmosphere of each jar. The peak height of each toluene signal in the GC measurement is representative of the toluene concentration in the jar. Lower peak heights indicate lower amounts of toluene in the environment and higher levels of adsorbence by the activated carbon samples.

Using the same amounts of activated carbon that were untreated, the process was repeated. These are shown as the "Control" values in the table below. The values shown are in arbitrary units.

RELATIVE TOLUENE CONCENTRATION
(as indicated by GC Peak Height)

| Example | Control | Treated |
|---------|---------|---------|
| 1 | 14,402 | 6,107 |
| 2 | 15,275 | 4,918 |
| 3 | 19,459 | 7,191 |

The data shows that the fluorocarbon treatment, as described herein, improves the adsorbency of the activated carbon where the adsorbent is artificial sweat. Further, it shows that the treatment is effective on both granules and fabric.

Preparation of Composite made with Treated Carbon

Activated carbon cloth made from phenol formaldehyde resin is particularly well suited for use in a composite structure to create biological and chemical protective suits. To evaluate the present treatment in connection with this anticipated use, the following trial was conducted.

The carbon cloth of Example 2 was used in this trial, both as an untreated cloth and as treated according to the process described in Example 2.

The treated and untreated cloths were each laminated between a tricot knit fabric having a weight of 2.3 oz/yd$^2$ and a needle-punched nonwoven fabric having a weight of 1.2 oz/yd$^2$, using about 20 g/yd$^2$ of dot-printed copolyamide adhesive pre-applied to the two fabrics. Each layered structure (knit fabric with pre-printed adhesive, treated or untreated carbon cloth, nonwoven fabric with pre-printed adhesive) was fed through a belt laminator at 140° C. for about 30 seconds. The resulting composites were then subjected to evaluation.

It was observed that the fluorocarbon treatment on the activated carbon cloth had no adverse effect on the ability to form a composite structure (that is, the bonding between the carbon cloth and the adhesive layers was not compromised). Additionally, since only the core of the composite was treated to be hydrophobic, the outer fabric layers of the composite remained relatively hydrophilic. The dual nature of the composite structure is believed to provide comfort to users thereof, by allowing good air permeability and moisture wicking.

The gas adsorptive properties of the two composites (containing treated and untreated carbon cloths) were tested according to the following procedure. The gas adsorption test was used to measure the adsorbent properties of the composite.

1. A one-inch square of the composite was enclosed in a 22-milliliter glass vial with a rubber septum stopper.
2. 60 microliters of a blend of a 1:1:3:3 ratio of carbon tetrachloride, dimethyl sulfide, methyl salicylate, and dimethyl methyl phosphonate were injected into the vial.
3. The vial was placed in an oven at 50° C. for one hour.
4. The vial was removed from the oven and allowed to cool to room temperature.
5. A solid phase microextraction (SPME) fiber was then inserted into the vial to sample the gas vapor.
6. An Agilent 6890 Gas Chromatograph (GC) with a 5973 mass selective detector was used to measure the relative concentration of each of the four compounds in the vial's headspace. The peak area of each component's gas chromatograph signal was representative of the relative concentration of each component.

This test was performed before the composite samples were washed and again after each of the composites had been washed 6 times in an industrial laundry machine (with drying after each wash). The washing and drying was performed in accordance with the following test procedure.

Washing/Drying Procedure

The textile composite was washed in a 35-pound Milnor front-load washing machine, with a total load of 30 pounds of textile, using type 2 laundry detergent NSN 7930-00-252-6797 available from Cosco Company of Brooklyn, N.Y.

The following wash cycles were used:

WASHING PROCEDURE

| Operation | Time (minutes) | Temperature (F) | Water Level | Detergent Usage/ 30 lb. load |
|-----------|----------------|-----------------|-------------|------------------------------|
| Break | 6 | 110 | High | 85 g |
| Wash | 2 | 110 | High | 51 g |
| Rinse | 2 | 90 | High | |
| Rinse | 2 | 90 | High | |
| Rinse | 2 | 90 | High | |
| Extract (low speed) | 5 | n/a | n/a | |

After each wash, the textile composite was dried in a 50-pound gas dryer for 30 minutes at a "Low Delicates" setting (about 120° F.), followed by a 5-minute cool-down period. The drying step (30-minute cycle, 5-minute cool-down) was repeated after the sixth drying cycle to ensure that the composite was completely dry.

Returning again to the gas adsorption test procedure, the results are shown in the table below, where the values represent the peak area on the gas chromatograph, as measured in arbitrary units. Lower peak heights indicate lower amounts of the chemical compound in the environment and higher levels of adsorbence by the activated carbon samples.

ADSORPTIVE CAPACITY COMPARISON TEST
(as measured in arbitrary units by relative GC peak height)

| | Untreated | | Treated | |
|---|---|---|---|---|
| Chemical Compound | Before washing | After 6 Washes | Before washing | After 6 Washes |
| Dimethyl sulfide | 320.13 | 541.25 | 213.67 | 66.89 |
| Carbon tetrachloride | 303.22 | 1490.93 | 98.51 | 32.36 |
| Dimethyl methyl phosphonate | 89.3 | 1191.14 | 310.89 | 77.62 |
| Methyl salicylate | 3.23 | 299.15 | 102.13 | 44.28 |

As can be seen from the test data, the adsorptive capacity of the activated carbon is significantly decreased in the untreated sample, that is, without the presence of a fluorocarbon treatment. This is particularly evident after laundering. For each compound, the treated activated carbon showed better adsorption after laundering than it did initially. Accordingly, this test indicates that, when an adsorbent composite as described herein is treated with a fluorocarbon as described herein, laundering actually improves the adsorption effective of the activated carbon. The opposite trend is observed with the untreated carbon samples.

I claim:

1. A gas-adsorbing material, said gas-adsorbing material comprising a first component and a second component disposed substantially on the surface of said first component,
   wherein said first component comprises activated carbon, and
   wherein said second component comprises a film-forming fluorocarbon copolymer resin having (i) at least one monomer selected from the group consisting of urethane and acrylate, said at least one monomer having a $C_4$ to $C_{24}$ perfluoro-alkyl radical attached thereto and (ii) at least one non-fluorinated monomer, wherein said second component is present in an amount of between 0.1% and 3% by weight of said first component.

2. A gas-adsorbing material, said gas-adsorbing material comprising a first component and a second component disposed substantially on the surface of said first component,
   wherein said first component comprises activated carbon,
   wherein said second component comprises a film-forming fluorocarbon copolymer resin having (i) at least one monomer selected from the group consisting of urethane and acrylate, said at least one monomer having a $C_4$ to $C_{24}$ perfluoro-alkyl radical attached thereto and (ii) at least one non-fluorinated monomer, wherein said second component is present in an amount of between 0.1% and 3% by weight of said first component, and
   wherein said activated carbon is made from one or more sources selected from the group consisting of coconut shells, coal, wood, rayon, peat, polyacrylonitrile, phenol formaldehyde resin, and cross-linked polystyrene resin.

3. The gas-adsorbing material of claim 2, wherein said activated carbon is made from coconut shells.

4. The gas-adsorbing material of claim 2, wherein said activated carbon is made from phenol formaldehyde resin.

5. The gas-adsorbing material of claim 1, wherein said activated carbon component has a form selected from the group consisting of powders, particles, granules, spheres, pellets, fibers, and fabrics.

6. The gas-absorbing material of claim 5, wherein said activated carbon component is a fabric.

7. The gas-adsorptive material of claim 5, wherein said activated carbon component is granules.

8. The gas-adsorptive material of claim 1, wherein said fluorocarbon copolymer resin is an acrylic copolymer that contains a monomer with a perfluorinated alkyl chain.

* * * * *